United States Patent
Tokumaru et al.

(10) Patent No.: US 10,838,238 B2
(45) Date of Patent: Nov. 17, 2020

(54) AROMATIC POLYCARBONATE POLARISING LENS

(71) Applicants: MITSUBISHI GAS CHEMICAL COMPANY, INC., Tokyo (JP); MGC FILSHEET CO., LTD., Saitama (JP)

(72) Inventors: Terutaka Tokumaru, Tokyo (JP); Hideaki Kimura, Saitama (JP); Masayuki Akaki, Saitama (JP); Kyousuke Nakamura, Tokyo (JP)

(73) Assignees: MITSUBISHI GAS CHEMICAL COMPANY, INC., Tokyo (JP); MGC FILSHEET CO., LTD., Saitama (JP)

(*) Notice: Subject to any disclaimer, the term of this patent is extended or adjusted under 35 U.S.C. 154(b) by 0 days.

(21) Appl. No.: 16/253,579

(22) Filed: Jan. 22, 2019

(65) Prior Publication Data

US 2019/0155059 A1    May 23, 2019

Related U.S. Application Data

(63) Continuation of application No. 14/348,753, filed as application No. PCT/JP2012/076055 on Oct. 1, 2012, now abandoned.

(30) Foreign Application Priority Data

Oct. 3, 2011   (JP) .................. 2011-218919

(51) Int. Cl.
  *B32B 41/00*   (2006.01)
  *G02C 7/12*    (2006.01)
  (Continued)

(52) U.S. Cl.
  CPC ............ *G02C 7/12* (2013.01); *G02B 5/3033* (2013.01); *B29D 11/00644* (2013.01);
  (Continued)

(58) Field of Classification Search
  CPC ........... G02C 7/12; C02B 5/3033; B32B 7/12; B32B 27/08; B32B 27/20; B32B 27/306;
  (Continued)

(56) References Cited

U.S. PATENT DOCUMENTS

| 4,992,218 A | 2/1991 | Sugito et al. |
| 5,051,309 A | 9/1991 | Kawaki et al. |

(Continued)

FOREIGN PATENT DOCUMENTS

| EP | 0395019 | 10/1990 |
| JP | 03-039903 | 2/1991 |

(Continued)

OTHER PUBLICATIONS

U.S. Appl. No. 14/346,829 to Terutaka Tokumaru et al., which was filed on Mar. 24, 2014.

(Continued)

*Primary Examiner* — Michael N Orlando
*Assistant Examiner* — Joshel Rivera
(74) *Attorney, Agent, or Firm* — Greenblum & Bernstein, P.L.C.

(57) ABSTRACT

Provided is a polarizing lens which is excellent in terms of impact resistance, outer appearance and prevention of eye strain and which exhibits little variation in color tone and transmittance during formation. The polarizing lens is formed by stretching a polyvinyl alcohol film and dyeing it with a dichroic dye, bonding an aromatic polycarbonate sheet to both surfaces of the film by means of an adhesive layer, and then inserting a polarizing sheet, bent to have a spherical or aspherical surface, into a mold, and injecting aromatic polycarbonate thereto, wherein the area in which the dichroic dye seeps from the surface of the polyvinyl alcohol film is not more than a quarter of the thickness of the polyvinyl alcohol film.

12 Claims, 4 Drawing Sheets

(51) Int. Cl.
*G02B 5/30* (2006.01)
*B32B 7/12* (2006.01)
*B32B 27/08* (2006.01)
*B32B 27/20* (2006.01)
*B32B 27/30* (2006.01)
*B32B 1/00* (2006.01)
*B29D 11/00* (2006.01)
*B32B 27/36* (2006.01)
*C08J 5/12* (2006.01)

(52) U.S. Cl.
CPC . *B32B 1/00* (2013.01); *B32B 7/12* (2013.01); *B32B 27/08* (2013.01); *B32B 27/20* (2013.01); *B32B 27/306* (2013.01); *B32B 27/365* (2013.01); *B32B 2307/4026* (2013.01); *B32B 2307/42* (2013.01); *B32B 2307/558* (2013.01); *B32B 2551/00* (2013.01); *C08J 5/124* (2013.01); *C08J 2329/04* (2013.01); *C08J 2369/00* (2013.01); *C08J 2475/04* (2013.01)

(58) Field of Classification Search
CPC .............. B32B 1/00; B32B 2307/4026; B32B 2307/42; B32B 2307/558; B32B 2551/00; B32B 27/365; C08J 2369/00; C08J 5/124; C08J 2329/04; C08J 2475/04; B29D 11/00644
USPC ................... 156/60, 64, 350, 351, 378, 379
See application file for complete search history.

(56) References Cited

U.S. PATENT DOCUMENTS

| | | | |
|---|---|---|---|
| 5,702,813 A | 12/1997 | Murata et al. | |
| 5,827,614 A | 10/1998 | Bhalakia et al. | |
| 5,926,310 A * | 7/1999 | Tamura | G02B 5/3033 |
| | | | 351/159.62 |
| 6,833,099 B2 | 12/2004 | Sanefuji et al. | |
| 7,787,084 B2 | 8/2010 | Ito et al. | |
| 7,815,972 B2 | 10/2010 | Kameyama et al. | |
| 7,931,369 B2 | 4/2011 | Harris et al. | |
| 2011/0205627 A1 | 8/2011 | Kobuchi et al. | |
| 2011/0211154 A1 | 9/2011 | Aoyama et al. | |
| 2013/0070196 A1 | 3/2013 | Tokumaru et al. | |

FOREIGN PATENT DOCUMENTS

| | | |
|---|---|---|
| JP | 08-052817 | 2/1996 |
| JP | 8-313701 | 11/1996 |
| JP | 2002-082222 | 3/2002 |
| JP | 2005-326872 | 11/2005 |
| JP | 2010-026498 | 2/2010 |
| WO | 2009-154050 | 12/2009 |

OTHER PUBLICATIONS

International Search Report dated Jan. 15, 2013 in PCT/JP2012/076055.
Search report from E.P.O. in EP 12838073.0 dated May 27, 2015.

* cited by examiner

[A]

[B]

[C]

[D]

[E]

AROMATIC POLYCARBONATE POLARISING LENS

CROSS-REFERENCE TO RELATED APPLICATIONS

The present application is a Continuation of U.S. application Ser. No. 14/348,753, which is a National stage of International Patent Application No. PCT/JP2012/076055, filed Oct. 1, 2012, which claims priority to Japanese Application No. 2011-218919, filed Oct. 3, 2011. The disclosures of application Ser. No. 14/348,753 and International Patent Application No. PCT/JP2012/076055 are incorporated by reference herein in their entireties.

TECHNICAL FIELD

The present invention relates to a polarizing lens obtained by subjecting a polarizing sheet to a bending process to provide a bent surface shape, or a polarizing lens constituted of an aromatic polycarbonate, which is formed by subjecting a polarizing sheet to a bending process to provide a bent surface shape, and then injecting the aromatic polycarbonate to one of the surfaces of the polarizing sheet.

BACKGROUND ART

Polarizing sheets constituted of a polycarbonate have excellent impact resistance and are light, and therefore are used for liquid crystal displays as well as windows of buildings, sunroofs of cars, and sunglasses or goggles to be used for marine sports, winter sports, fishing, etc.

Polarizing sheets, which are obtained by laminating an aromatic polycarbonate sheet as a protection layer through an adhesive layer to each surface of a polarizing film obtained by stretching a polyvinyl alcohol film and dyeing it with a dichroic dye (hereinafter referred to as "aromatic polycarbonate polarizing sheet"), particularly have excellent impact resistance and also have high heat resistance, and therefore are used for polarizing lenses for sunglasses or goggles obtained from a bending process or injection molding process.

However, since aromatic polycarbonate has a high photoelastic constant, when a bending process is applied to a spherical or aspherical shape of sunglasses, goggles or the like, a coloring interference stripe tends to easily occur due to retardation. Such a coloring interference stripe has problems such as poor outer appearance and causing eye strain.

Further, in the case of a polarizing lens obtained by subjecting an aromatic polycarbonate polarizing sheet to a bending process to provide a spherical or aspherical shape, distortion of an image may be caused by unevenness of the thickness of the aromatic polycarbonate polarizing sheet, and there are problems such as poor outer appearance and causing eye strain.

Regarding retardation caused at the time of applying a bending process, an aromatic polycarbonate polarizing sheet, whose coloring interference stripe has been hidden from view by subjecting an aromatic polycarbonate sheet to be used for a protection layer to a stretching process to cause a large retardation in advance (hereinafter referred to as "stretched polycarbonate polarizing sheet"), is known (Patent Document 1), and is used for polarizing lens products which have excellent outer appearance and are excellent in saving eye strain.

Meanwhile, a polarizing lens, which is formed by subjecting the afore-mentioned stretched polycarbonate polarizing sheet to a bending process to provide a spherical or aspherical shape, inserting the resultant stretched polycarbonate polarizing sheet into a mold and injecting an aromatic polycarbonate thereto, for the purpose of improving impact resistance more than that of a polarizing lens formed by subjecting the afore-mentioned stretched polycarbonate polarizing sheet to a bending process or forming a corrective lens having a focal refractive power (hereinafter referred to as "aromatic polycarbonate polarizing lens"), is known (Patent Documents 2 and 3).

In the case of the aromatic polycarbonate polarizing lens, an aromatic polycarbonate is injected and filled in a mold, and therefore, there is an advantage that unevenness of the thickness of the inserted stretched polycarbonate sheet becomes invisible. Therefore, the aromatic polycarbonate polarizing lens is used for lens products without focal refractive power which are particularly excellent in impact resistance, outer appearance and prevention of eye strain.

In the case of a lens obtained by filling a mold with a thermosetting resin or thermoplastic resin as in the case of the aromatic polycarbonate polarizing lens, the shape of each surface and the thickness of the formed lens can be freely set by suitably setting each surface shape of molds for the lens surfaces and the distance between the surfaces. Therefore, the surface shapes of molds and the distance between the surfaces are set based on the optical design so that the focal refractive power, prism diopter and image distortion of the formed lens become desired values.

In many cases, the surface shape of the formed lens is the same as the surface shape of the mold contacted at the time of forming, but when the surface shape of the lens requires very high precision, in order to compensate decrease of the lens thickness and change of the surface shape due to volume contraction at the time of solidification of the thermosetting resin or thermoplastic resin filled in the mold, the surface shapes of molds for both the surfaces and the distance between the surfaces may be suitably and finely adjusted.

On the surface of the aromatic polycarbonate polarizing lens formed in this way, a hard coating, an antireflection film and the like are suitably formed, and then the lens is fixed to a frame by edging, hole making, screw tightening, etc., thereby providing sunglasses or goggles.

In the meantime, in the case of polarizing lenses in which an aromatic polycarbonate polarizing sheet is subjected to a bending process to provide a spherical or aspherical shape or aromatic polycarbonate polarizing lenses, for the purpose of reducing the glare of a glass surface, water surface, etc., polarized light in the horizontal direction is cut. In addition, for the purpose of improving visibility or design, for example, an aromatic polycarbonate polarizing sheet colored in grey, brown or the like is used to provide a desired color tone and transmittance.

In order to increase the polarization degree of a polarizing lens, the amount of a dichroic dye dyeing a polyvinyl alcohol film is adjusted to obtain a concentration at which a polarization component in the horizontal direction of light incident on the polarizing lens is almost absorbed, and when the amount of the dichroic dye dyeing the polyvinyl alcohol film is further increased, a polarization component in the perpendicular direction of light incident on the polarizing lens is also absorbed in a large amount.

Further, regarding the dichroic dye for dyeing the polyvinyl alcohol film, not single, but several colors of dichroic dyes are used. In this regard, by changing the amount of each dichroic dye for dyeing the polyvinyl alcohol film, a polarizing lens having a desired color tone and transmittance can be obtained.

Further, it is also possible to adjust the color tone and transmittance of the aromatic polycarbonate polarizing sheet by using a dye-dissolved product in an adhesive layer or an aromatic polycarbonate sheet of a protection layer, or by using it in combination with the aforementioned method.

PRIOR ART DOCUMENTS

Patent Documents

Patent Document 1: Japanese Laid-Open Patent Publication No. H03-39903
Patent Document 2: Japanese Laid-Open Patent Publication No. H08-52817
Patent Document 3: Japanese Laid-Open Patent Publication No. H08-313701

SUMMARY OF THE INVENTION

Problems to be Solved by the Invention

As described above, an aromatic polycarbonate polarizing sheet is subjected to a bending process to provide a spherical or aspherical shape, or an aromatic polycarbonate polarizing sheet subjected to a bending process is then inserted into a mold, to which aromatic polycarbonate is injected, thereby obtaining a polarizing lens which is excellent in terms of impact resistance, outer appearance and prevention of eye strain.

However, in the case of an aromatic polycarbonate polarizing lens obtained by subjecting an aromatic polycarbonate polarizing sheet to a bending process to provide a spherical or aspherical shape or an aromatic polycarbonate polarizing lens obtained by further subjecting the sheet to injection molding, the color tone and transmittance of the aromatic polycarbonate polarizing sheet significantly change before and after molding of the polarizing lens, and as a result, there is a problem that the difference among products is increased.

It was found by studies that at the time of forming an aromatic polycarbonate polarizing lens by means of injection molding, an aromatic polycarbonate polarizing sheet after subjected to the bending process is subjected to injection molding while being cooled by a mold, and therefore the color tone and transmittance of the aromatic polycarbonate polarizing sheet are changed just a little and not changed substantially.

However, it was also found that, in the case of a polarizing lens obtained by subjecting an aromatic polycarbonate polarizing sheet to the bending process to provide a spherical or aspherical shape or an aromatic polycarbonate polarizing lens, since heating at the time of the bending process is carried out to a temperature around the glass-transition temperature of the aromatic polycarbonate used for the polarizing sheet, the color tone and transmittance of the aromatic polycarbonate polarizing sheet significantly change, resulting in significant difference between products.

In particular, there is a problem that, in the case of an aromatic polycarbonate polarizing lens having a high dye concentration and a low transmittance, the color tone and transmittance of the aromatic polycarbonate polarizing sheet after molding are significantly changed from those before molding compared to an aromatic polycarbonate polarizing lens having a low dye concentration and a high transmittance.

In addition, there is a problem that, when the color tone and transmittance after molding significantly change from those before molding, the variations of the color tone and transmittance are not constant, resulting in differences of the color tone and transmittance between products after molded.

Means for Solving the Problems

The present invention is a polarizing lens, which is formed by stretching a polyvinyl alcohol film and dyeing the film with a dichroic dye, bonding an aromatic polycarbonate sheet to both surfaces of the film via an adhesive layer and bending the obtained product to have a spherical or aspherical surface, wherein the area in which the dichroic dye seeps from the surface of the polyvinyl alcohol film is not more than a quarter of the thickness of the polyvinyl alcohol film, and wherein the central portion in the thickness direction of the polyvinyl alcohol film is not dyeing with the dichroic dye.

Further, the present invention is a polarizing lens, which is formed by stretching a polyvinyl alcohol film and dyeing the film with a dichroic dye, bonding an aromatic polycarbonate sheet to both surfaces of the film via an adhesive layer, bending the obtained product to have a spherical or aspherical surface and injecting an aromatic polycarbonate to one of the surfaces of the polarizing sheet, wherein the area in which the dichroic dye seeps from the surface of the polyvinyl alcohol film is not more than a quarter of the thickness of the polyvinyl alcohol film, and wherein the central portion in the thickness direction of the polyvinyl alcohol film is not dyeing with the dichroic dye.

Advantageous Effect of the Invention

According to the present invention, it is possible to stably provide an aromatic polycarbonate polarizing lens, which exhibits little variation in the color tone and transmittance before and after forming into the polarizing lens, and which provides little difference between products.

EMBODIMENTS FOR CARRYING OUT THE INVENTION

Figure 1:
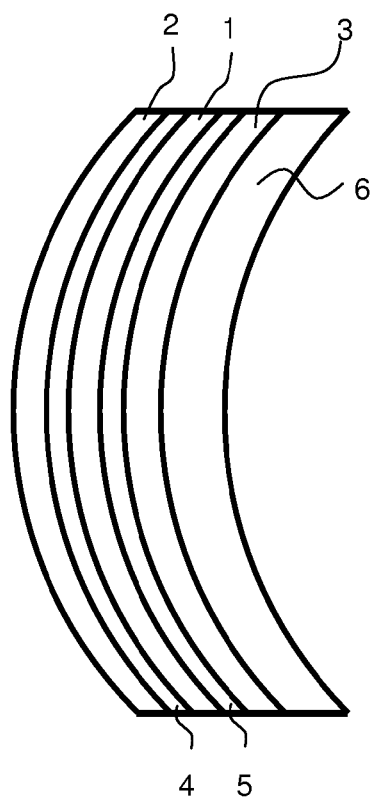
FIG. 1 shows a cross sectional view of an aromatic polycarbonate polarizing lens according to the present invention.

The aromatic polycarbonate polarizing lens of the present invention will be described below.

Firstly, a resin film as a base material for a polarizing film is swollen in water, and then immersed in a dyeing solution containing a dye such as a dichroic dye while being directionally stretched to disperse the dichroic dye in the base resin in an oriented state, thereby obtaining a polarizing film to which polarization properties have been imparted.

As the resin as the base material for the polarizing film to be used in this case, polyvinyl alcohols may be used. As the polyvinyl alcohols, polyvinyl alcohol (hereinafter referred to as "PVA"), PVA in which a slight amount of the acetic acid ester structure remains, and PVA derivatives, or polyvinyl formal that is an analog, polyvinyl acetal, saponified ethylene-vinyl acetate copolymer, etc. are preferred, and PVA is particularly preferred.

Further, regarding the molecular weight of a PVA film, from the viewpoint of stretchability and film strength, the weight-average molecular weight is preferably 50,000 to 350,000, and particularly preferably 150,000 to 300,000. The scaling factor of stretching of the PVA film is preferably 2- to 8-fold, and particularly preferably 3- to 5-fold from the viewpoint of the dichroic ratio and film strength after stretching. The thickness of the PVA film after stretching is not particularly limited, but because the film tears easily when it is thin and the light transmission of the film is reduced when it is thick, the thickness of the film is preferably about 20 to 50 μm.

Further, as a dye to be used in this case, from the viewpoint of dyeing properties with respect to the PVA film and heat resistance, a direct dye consisting of an azo dye having a sulfonic acid group is preferred, and direct dyes of respective colors are dissolved or dispersed in a dyeing solution at a concentration at which a desired color tone and transmittance of the polarizing film can be obtained. In addition to the direct dyes, an inorganic salt such as sodium chloride and sodium sulfate, as a dyeing aid, is suitably added to the dyeing solution.

The present inventors found that change in the color tone and transmittance when producing an aromatic polycarbonate polarizing sheet and subjecting it to the bending process while maintaining its processability so as not to generate a crack in a polarizing film varies depending on the depth of the area in which a dye seeps from the surface of a resin film as a base material of the polarizing film, and that the deeper the area in which the dye seeps from the surface of the resin film as the base material of the polarizing film is, the more the change in the color tone and transmittance when subjecting the sheet to the bending process while maintaining its processability so as not to generate a crack in the polarizing film increases.

Specifically, the present inventors found that when the area in which the dye seeps from the surface of the resin film as the base material of the polarizing film is shallow, the change in the color tone and transmittance when subjecting the sheet to the bending process while maintaining its processability so as not to generate a crack in the polarizing film is small, and that particularly when the area in which the dye seeps from the surface of the resin film as the base material of the polarizing film is not more than a quarter of the thickness of the resin film, the change in the color tone and transmittance when subjecting the sheet to the bending process while maintaining its processability so as not to generate a crack in the polarizing film is small.

The depth of the area in which the dye seeps from the surface of the resin film can be adjusted by the temperature of the dyeing solution and the immersion time.

When the temperature of the dyeing solution is too high, the resin film as the base material of the polarizing film is dissolved therein, and when the temperature is too low, the rate of seeping of the dye is too slow and this requires dyeing for a long period of time, result in reduction of productivity, or it becomes difficult to control the temperature because it is too close to room temperature. Therefore, the temperature of the dyeing solution in the case of the PVA film is preferably 20° C. to 70° C., and particularly preferably 30° C. to 45° C.

The immersion time is selected such that the depth of the area in which the dye seeps from the surface of the resin film as the base material of the polarizing film becomes desirable.

Preferably, the polarizing film is further treated with a metal compound and boric acid because it imparts excellent heat resistance and solvent resistance to the polarizing film.

Specifically, the polarizing film can be treated by using a method in which the polarizing film dyeing in a solution of a dichroic dye is stretched during or after immersing in a mixed solution of a metal compound and boric acid, or a method in which the polarizing film dyeing and stretched in a solution of a dichroic dye is immersed in a mixed solution of a metal compound and boric acid.

As the metal compound, transition metals belonging to Period 4, Period 5 and Period 6 may be used. Among such metal compounds, those whose effects of heat resistance and solvent resistance have been confirmed exist, but from the viewpoint of the cost, metal salts such as acetate, nitrate and sulfate of fourth-period transition metals such as chromium, manganese, cobalt, nickel, copper and zinc are preferred. Among them, compounds of nickel, manganese, cobalt, zinc and copper are more preferred because they are inexpensive and excellent in the aforementioned effects.

More specific examples thereof include manganese (II) acetate tetrahydrate, manganese (III) acetate dihydrate, manganese (II) nitrate hexahydrate, manganese (II) sulfate pentahydrate, cobalt (II) acetate tetrahydrate, cobalt (II) nitrate hexahydrate, cobalt (II) sulfate heptahydrate, nickel (II) acetate tetrahydrate, nickel (II) nitrate hexahydrate, nickel (II) sulfate hexahydrate, zinc (II) acetate, zinc (II) sulfate, chromium (III) nitrate nonahydrate, copper (II) acetate monohydrate, copper (II) nitrate trihydrate and copper (II) sulfate pentahydrate. Among these metal compounds, any one of them may be used solely, and alternatively, a plurality of types of compounds may be used in combination.

Regarding the content of the metal compound and boric acid in the polarizing film, from the viewpoint of imparting heat resistance and solvent resistance to the polarizing film, the content of the metal compound as a metal is preferably 0.2 to 20 mg, and more preferably 1 to 5 mg per 1 g of the polarizing film. The content of boric acid as boron is preferably 0.3 to 30 mg, and more preferably 0.5 to 10 mg.

The composition of a treatment solution to be used for the treatment is set so as to satisfy the above-described contents. In general, it is preferred that the concentration of the metal compound is 0.5 to 30 g/L and that the concentration of boric acid is 2 to 20 g/L.

Analysis of the content of metal and boron in the polarizing film can be conducted using atomic absorption spectrometry.

Regarding the immersion temperature for the step of immersion using the metal compound and boric acid, when the temperature is too high, a resin film as a base material of the polarizing film is dissolved, and when the temperature is too low, it is difficult to control the temperature because it is too close to room temperature. Therefore, the immersion temperature is preferably 20 to 70° C., and particularly preferably 30 to 45° C. Further, the immersion time in the step of immersion using the metal compound and boric acid is preferably 0.5 to 15 minutes. Regarding conditions for the step of heating after immersion, heating is carried out at a temperature of 70° C. or higher, preferably at a temperature of 90 to 120° C. for 1 to 120 minutes, preferably for 3 to 40 minutes.

Next, a protection layer consisting of an aromatic polycarbonate sheet is laminated to each surface of the polarizing film through an adhesive layer. As a resin material for the aromatic polycarbonate sheet to be used in this case, from the viewpoint of the film strength, heat resistance, durability or bending workability, polymers produced according to the well-known method from a bisphenol compound typified by 2,2-bis(4-hydroxyphenyl)alkane or 2,2-(4-hydroxy-3,5-dihalogenophenyl)alkane are preferred, and the polymer skeleton thereof may include a structural unit derived from a fatty acid diol or a structural unit having ester bonds. In particular, an aromatic polycarbonate induced from 2,2-bis (4-hydroxyphenyl)propane is preferred.

Regarding the molecular weight of the aromatic polycarbonate sheet, from the viewpoint of forming of the sheet itself, the viscosity-average molecular weight is preferably 12,000 to 40,000, and from the viewpoint of the film strength, heat resistance, durability or bending workability, the viscosity-average molecular weight is particularly preferably 20,000 to 35,000. Regarding the retardation value of the aromatic polycarbonate sheet, from the viewpoint of suppression of a coloring interference stripe, the lower limit thereof is preferably 2,000 nm or higher. The upper limit thereof is not particularly limited, but from the viewpoint of the film production, the upper limit is preferably 20,000 nm or lower, and particularly preferably 4,000 nm or higher and 20,000 nm or lower. When the retardation value is higher, a coloring interference stripe is not easily generated, but there is a disadvantage that the surface shape precision is lower.

When using the aromatic polycarbonate sheet having a high retardation value at the light incidence side of the polarizing film, i.e., the opposite side of the human eye, a coloring interference stripe is not easily generated.

As an adhesive to be used for lamination of aromatic polycarbonate on the surfaces of the polarizing film, an acrylic resin-based material, a urethane resin-based material, a polyester resin-based material, a melamine resin-based material, an epoxy resin-based material, a silicone-based material or the like may be used, and in particular, from the viewpoint of the adhesive layer itself or transparency and adhesion properties with respect to aromatic polycarbonate at the time of adhering, a two-component thermosetting urethane resin consisting of polyurethane prepolymer that is a urethane resin-based material and a curing agent is preferred. The aromatic polycarbonate polarizing sheet is obtained in this way.

The aromatic polycarbonate polarizing sheet to be used for the aromatic polycarbonate polarizing lens of the present invention is not limited to the aforementioned aromatic polycarbonate polarizing sheet. It is also possible to use an aromatic polycarbonate polarizing sheet also having the photochromic function, which is prepared using an adhesive in which a photochromic dye is dissolved for adhesion between the polarizing film and the aromatic polycarbonate of the protection layer. The similar effects can be obtained by a polarizing lens formed by subjecting an aromatic polycarbonate sheet to be used for the protection layer of the polarizing film to the stretching treatment in advance to provide a stretched polycarbonate polarizing sheet in which a large retardation has been generated, subjecting the stretched polycarbonate polarizing sheet to the bending process to impart spherical or aspherical surfaces thereto, and inserting the polarizing sheet into a mold and injecting the aromatic polycarbonate thereon in the above-described way.

Next, the stretched polycarbonate polarizing sheet is subjected to the bending process.

Conditions for the bending process of the stretched polycarbonate polarizing sheet are not particularly limited, but the sheet must be bent so that it fits the surface of a mold to be used for injection molding. Further, in the case of the polarizing film, a crack in the stretching direction, so-called film cutting tends to be easily generated in the bending process. In view of these points, the mold temperature in the bending process of the stretched polycarbonate polarizing sheet is preferably a temperature around the glass-transition temperature of the aromatic polycarbonate used for the stretched polycarbonate polarizing sheet. In addition, the temperature of the stretched polycarbonate polarizing sheet immediately prior to the bending process is preferably adjusted to a temperature which is equal to or higher than a temperature 50° C. lower than the glass-transition temperature of the aromatic polycarbonate and lower than the glass-transition temperature by means of the preheating treatment, and particularly preferably adjusted to a temperature which is equal to or higher than a temperature 40° C. lower than the glass-transition temperature and lower than a temperature 5° C. lower than the glass-transition temperature.

Next, the aromatic polycarbonate may be injected to the stretched polycarbonate polarizing sheet.

Conditions for injection molding are not particularly limited, but excellent outer appearance is required. From this viewpoint, the mold temperature is preferably a temperature which is equal to or higher than a temperature 50° C. lower than the glass-transition temperature of the aromatic polycarbonate used for the stretched polycarbonate polarizing sheet and lower than the glass-transition temperature, and particularly preferably a temperature which is equal to or higher than a temperature 40° C. lower than the glass-transition temperature and lower than a temperature 15° C. lower than the glass-transition temperature.

Next, the hard coating treatment may be carried out.

Materials of hard coating and processing conditions are not particularly limited, but excellent outer appearance and adhesiveness with respect to the aromatic polycarbonate as the base or inorganic layers such as a mirror coat and an antireflection coat to be subsequently coated are required. From this viewpoint, the burning temperature is preferably a temperature which is equal to or higher than a temperature 50° C. lower than the glass-transition temperature of the aromatic polycarbonate used for the stretched polycarbonate polarizing sheet and lower than the glass-transition temperature, and particularly preferably a temperature which is equal to or higher than a temperature 40° C. lower than the glass-transition temperature and lower than a temperature 15° C. lower than the glass-transition temperature, i.e., a temperature around 120° C. The time required for burning the hard coat is about 30 minutes to 2 hours.

EXAMPLES

Hereinafter, the present invention will be specifically described by way of illustrative examples, but the present invention is not limited thereto.

In general, a color tone in the case of using several colors of dyes can be calculated from the sum of absorbance of respective dyes used at 380 to 780 nm using the XYZ colorimetric system or L*a*b* colorimetric system.

The same calculation method can be employed in the case of polarizing films in which desired color tone and transmittance are obtained by using several colors of dichroic dyes and changing the amounts of dyeing of the respective dichroic dyes in a polyvinyl alcohol film, and color tones before and after forming an aromatic polycarbonate polarizing sheet can also be calculated from the sum of absorbance values of respective dichroic dyes before and after forming. In the working examples of the present invention, a single color of dichroic dye was used and the transmittance and color tone before and after forming were measured to obtain color difference.

Comparative Example 1

(a) Polarizing Film

Polyvinyl alcohol (Kuraray Co., Ltd., trade name: VF-PS #17500) was swollen in water at 35° C. for 270 seconds while being stretched 2-fold. After that, it was dyeing in an aqueous solution containing Sumilight Red 4B (C.I.28160) and 10 g/L of anhydrous sodium sulfate at 35° C.

This dyeing film was immersed in an aqueous solution containing 2.3 g/L of nickel acetate and 4.4 g/L of boric acid at 35° C. for 120 seconds while being stretched 4-fold. The film was dried at room temperature for 3 minutes in a state where the tension was retained, and then subjected to a heating treatment at 110° C. for 3 minutes, thereby obtaining a polarizing film.

The results of the measurement of the thickness of the obtained polarizing film and the area in which the dye seeped, and the dichroic ratio of the polarizing film at 530 nm, which is the maximum absorption wavelength of the dye used, are shown in Table 1 (Sample No. [1]). The dichroic ratio was obtained by the following formula:

$$\text{Dichroic ratio} = Az/Ax$$

In this regard, Ax represents an absorbance of linearly-polarized light in the maximum transmission direction, and Az represents an absorbance of linearly-polarized light in a direction perpendicular to the maximum transmission direction. Ax and Az were measured by allowing the linearly-polarized light to be incident on the sample, using a spectrophotometer manufactured by Shimadzu Corporation (UV-3600).

Figure 2:
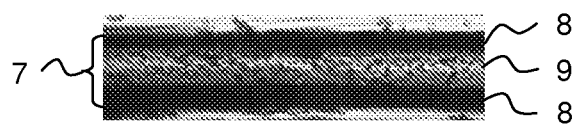
FIG. 2 shows photographs of cross-sectional surfaces of polarizing films to be used in an aromatic polycarbonate polarizing lens according to the present invention. Photograph [A] corresponds to Sample No. [1] of Comparative Example 1, and photographs [B] to [E] correspond to Sample Nos. [2] to [5] of Example 1, respectively.
Figure 2:
Figure 2:
Figure 2:
Figure 2:

A photograph of the cross-sectional surface of the obtained polarizing film is shown in FIG. 2 [A]. The photograph was taken using an optical microscope.

(b) Aromatic Polycarbonate Polarizing Sheet

A urethane-based adhesive was applied to the polarizing film obtained in (a) using a bar coater #12, and it was dried at 70° C. for 10 minutes. After that, an aromatic polycarbonate sheet having a thickness of 0.3 mm and a retardation value of 5500 nm (Mitsubishi Gas Chemical Co., Inc.) was bonded to the polarizing film using a laminating machine so that both the stretch axis of the aromatic polycarbonate sheet and the stretch axis of the polarizing film are in the horizontal direction of the polarizing lens.

The adhesive was applied to the polarizing film side of the laminated sheet in the same manner as above, and another aromatic polycarbonate sheet was bonded thereto in the same way, thereby obtaining an aromatic polycarbonate polarizing sheet. The thickness of the coated adhesive after curing was 9 to 11 μm.

(c) Measurement of Absorbance of Aromatic Polycarbonate Polarizing Lens

The transmittance and color tone of the prepared aromatic polycarbonate polarizing sheet were measured using the spectrophotometer manufactured by Shimadzu Corporation (UV-3600). The transmittance and the color tone obtained from the L*a*b* colorimetric system of Sample No. [1] are shown in Table 1.

(d) Aromatic Polycarbonate Polarizing Lens

The aromatic polycarbonate polarizing sheet obtained in (b) was subjected to the bending process using a mold having a base curve of 7.95 (curvature radius 66.67 mm). In the bending process, forming was carried out under the following conditions: mold temperature: 137° C., and retention time: 1200 seconds. The base curve as used herein refers to a curvature of the front surface of the lens, and it is a value obtained by dividing 530 by the curvature radius (unit of millimeter).

There was no crack in the polarizing film of the aromatic polycarbonate polarizing lens after the bending process.

The transmittance and color tone of the aromatic polycarbonate polarizing lens after the bending process of Sample No. [1] measured in a manner similar to that in (c), and the color difference ΔE*ab in the CIE1976 (L*a*b*) color space before and after forming are shown in Table 1. The color difference was obtained by the following formula:

$$(\Delta E^*ab = ((\Delta L^*)^2 + (\Delta a^*)^2 + (\Delta b^*)^2)^{1/2} \qquad \text{Color difference:}$$

Example 1

Polarizing films, in which the amount of dyeing of the dichroic dye was the same and the area in which the dichroic dye seeps was changed, were obtained in a manner similar to that in (a), except that the dye concentration and dyeing time in the dyeing process were changed. The photographs of cross-sectional surfaces of the obtained polarizing films are shown in [B] to [E] of FIG. 2.

Further, the results of the measurement of the thickness and the area in which the dye seeped of the obtained polarizing films, and the dichroic ratios of the polarizing films are shown in Sample Nos. [2] to [5] in Table 1.

Next, the transmittance and color tone of the aromatic polycarbonate polarizing lens before and after the bending process were measured and the color difference was obtained in manners similar to those in (b), (c) and (d). The results of the measurement are shown in Sample Nos. [2] to [5] in Table 1.

The color difference of each of Sample Nos. [4] and [5], in which the area in which the dye seeped was equal to or more than a third, was equal to or more than 2.4, and the color difference of each of Sample Nos. [2] and [3], in which the area in which the dye seeped was not more than a fifth, was not more than 1.9.

Further, there was no crack in the polarizing film of the aromatic polycarbonate polarizing lens after the bending process, and the processability of the lens was comparable to that of the aromatic polycarbonate polarizing lens of Comparative Example 1.

TABLE 1

| | Sample No. | Film thickness (μm) | Area in which dye seeps (μm) | Dichroic ratio of polarizing film | Color tone before bending process | | | | Color tone after bending process | | | | Color difference $\Delta E^*ab$ |
|---|---|---|---|---|---|---|---|---|---|---|---|---|---|
| | | | | | Transmittance (%) | $L^*$ | $a^*$ | $b^*$ | Transmittance (%) | $L^*$ | $a^*$ | $b^*$ | |
| Comparative Example 1 | [1] | 29.7 | 13.7 | 10.8 | 12.0 | 41.2 | −1.7 | 0.7 | 9.9 | 37.8 | 0.4 | 1.4 | 4.1 |
| Example 1 | [2] | 31.2 | 5.0 | 22.5 | 49.8 | 75.9 | 32.4 | 5.3 | 47.4 | 74.5 | 33.4 | 5.0 | 1.8 |
| | [3] | 31.1 | 6.5 | 21.2 | 48.5 | 75.1 | 32.9 | 6.0 | 46.3 | 73.7 | 34.1 | 5.6 | 1.9 |
| | [4] | 31.4 | 10.0 | 19.0 | 46.4 | 73.8 | 34.7 | 6.5 | 44.0 | 72.2 | 36.4 | 6.0 | 2.4 |
| | [5] | 31.7 | 12.0 | 17.8 | 45.2 | 73.0 | 35.7 | 7.0 | 43.6 | 72.0 | 38.1 | 6.2 | 2.8 |

Example 2

Figure 3:
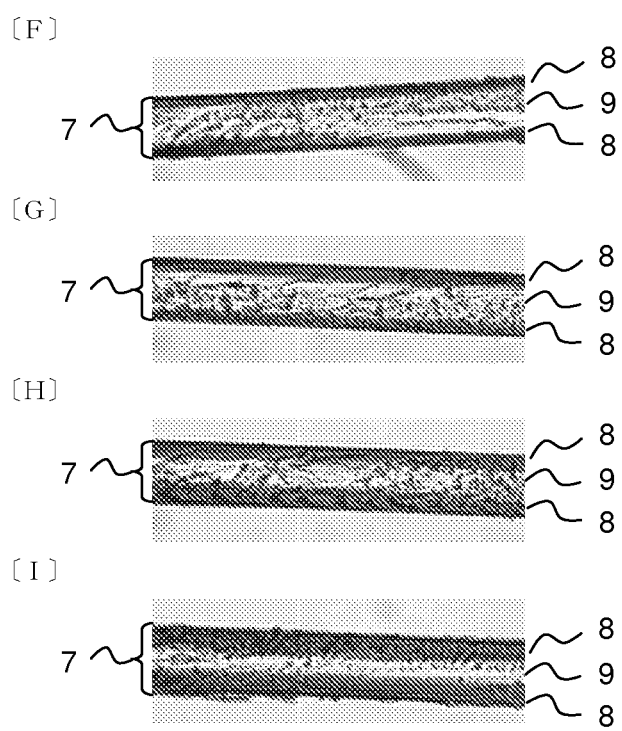
FIG. 3 shows photographs of cross-sectional surfaces of polarizing films to be used in an aromatic polycarbonate polarizing lens according to the present invention. Photographs [F] to [I] correspond to Sample Nos. [6] to [9] of Example 2, respectively.

Polarizing films, in which the amount of dyeing of the dichroic dye was the same and the area in which the dichroic dye seeps was changed, were obtained in a manner similar to that in Example 1, except that the film was stretched 4.4-fold in an aqueous solution containing nickel acetate and boric acid. The photographs of cross-sectional surfaces of the obtained polarizing films are shown in [F] to [I] of FIG. 3.

Further, the results of the measurement of the thickness and the area in which the dye seeped of the obtained polarizing films, and the dichroic ratios of the polarizing films are shown in Sample Nos. [6] to [9] in Table 2.

Next, the transmittance and color tone of the aromatic polycarbonate polarizing lens before and after the bending process were measured and the color difference was obtained in manners similar to those in (b), (c) and (d). The results of the measurement are shown in Sample Nos. [6] to [9] in Table 2.

The color difference of each of Sample Nos. [8] and [9], in which the area in which the dye seeped was equal to or more than a third, was 1.9, and the color difference of each of Sample Nos. [6] and [7], in which the area in which the dye seeped was not more than a quarter, was 1.4.

Further, there was no crack in the polarizing film of the aromatic polycarbonate polarizing lens after the bending process, and the processability of the lens was comparable to that of the aromatic polycarbonate polarizing lens of Comparative Example 1.

TABLE 2

| | Sample No. | Film thickness (μm) | Area in which dye seeps (μm) | Dichroic ratio of polarizing film | Color tone before bending process | | | | Color tone after bending process | | | | Color difference $\Delta E^*ab$ |
|---|---|---|---|---|---|---|---|---|---|---|---|---|---|
| | | | | | Transmittance (%) | $L^*$ | $a^*$ | $b^*$ | Transmittance (%) | $L^*$ | $a^*$ | $b^*$ | |
| Example 2 | [6] | 30.0 | 4.9 | 26.9 | 51.8 | 77.2 | 30.5 | 5.3 | 50.1 | 76.1 | 31.3 | 5.1 | 1.4 |
| | [7] | 29.8 | 6.9 | 25.3 | 49.5 | 75.8 | 31.7 | 6.0 | 47.8 | 74.7 | 32.6 | 5.8 | 1.4 |
| | [8] | 29.7 | 10.2 | 22.5 | 48.8 | 75.3 | 32.7 | 6.3 | 46.7 | 74.0 | 33.9 | 5.8 | 1.9 |
| | [9] | 29.6 | 12.1 | 22.0 | 48.3 | 75.0 | 33.1 | 6.3 | 46.2 | 73.7 | 34.4 | 6.0 | 1.9 |

Example 3

Figure 4:
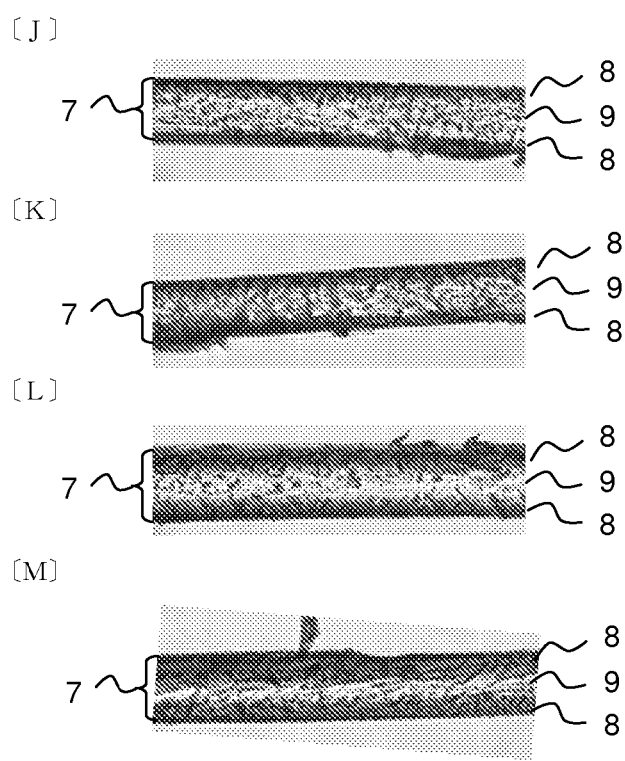
FIG. 4 shows photographs of cross-sectional surfaces of polarizing films to be used in an aromatic polycarbonate polarizing lens according to the present invention. Photographs [J] to [M] correspond to Sample Nos. [10] to [13] of Example 3, respectively.

Polarizing films, in which the amount of dyeing of the dichroic dye was the same and the area in which the dichroic dye seeps was changed, were obtained in a manner similar to that in Example 1, except that the film was stretched 4.8-fold in an aqueous solution containing nickel acetate and boric acid. The photographs of cross-sectional surfaces of the obtained polarizing films are shown in [J] to [M] of FIG. 4.

Further, the results of the measurement of the thickness and the area in which the dye seeped of the obtained polarizing films, and the dichroic ratios of the polarizing films are shown in Sample Nos. [10] to [13] in Table 3.

Next, the transmittance and color tone of the aromatic polycarbonate polarizing lens before and after the bending process were measured and the color difference was obtained in manners similar to those in (b), (c) and (d). The results of the measurement are shown in Sample Nos. [10] to [13] in Table 3.

The color difference of Sample No. [13], in which the area in which the dye seeped was about a half, was 2.4, and the color difference of each of Sample Nos. [10] to [12], in which the area in which the dye seeped was not more than a third, was not more than 1.7.

Further, there was no crack in the polarizing film of the aromatic polycarbonate polarizing lens after the bending process, and the processability of the lens was comparable to that of the aromatic polycarbonate polarizing lens of Comparative Example 1.

TABLE 3

|  | Sample No. | Film thickness (μm) | Area in which dye seeps (μm) | Dichroic ratio of polarizing film | Color tone before bending process | | | | Color tone after bending process | | | | Color difference Δ E*ab |
|---|---|---|---|---|---|---|---|---|---|---|---|---|---|
|  |  |  |  |  | Transmittance (%) | L* | a* | b* | Transmittance (%) | L* | a* | b* |  |
| Example 3 | [10] | 28.5 | 5.0 | 30.3 | 52.8 | 77.7 | 29.4 | 5.1 | 50.6 | 76.4 | 30.3 | 4.7 | 1.7 |
|  | [11] | 26.6 | 6.4 | 29.9 | 51.7 | 77.1 | 30.0 | 5.7 | 49.6 | 75.8 | 30.9 | 5.4 | 1.6 |
|  | [12] | 27.1 | 9.8 | 26.1 | 50.3 | 76.2 | 30.9 | 6.1 | 48.1 | 74.9 | 31.9 | 5.7 | 1.7 |
|  | [13] | 27.1 | 12.1 | 26.0 | 48.5 | 75.2 | 31.6 | 7.0 | 45.9 | 73.5 | 33.2 | 6.3 | 2.4 |

As is clearly understood from the working examples, in the case of the aromatic polycarbonate polarizing lens comprising a conventional polarizing film in which the area in which the dichroic dye seeps from the surface of the polyvinyl alcohol film is equal to or more than a quarter of the thickness of the polyvinyl alcohol film, the color difference before and after processing is large, whereas in the case of the aromatic polycarbonate polarizing lens comprising the polarizing film of the present invention, in which the area in which the dichroic dye seeps from the surface of the polyvinyl alcohol film is not more than a quarter of the thickness of the polyvinyl alcohol film and the central portion in the thickness direction of the polyvinyl alcohol film is not dyeing with the dichroic dye, the color difference before and after processing is small and the change in the color tone and transmittance before and after the bending process is small.

EXPLANATIONS OF LETTERS OR NUMERALS 1 polarizing film
2, 3 aromatic polycarbonate sheet
4, 5 adhesive layer
6 aromatic polycarbonate
7 cross-sectional surface of polarizing film
8 area in which dye seeps
9 area in which dye does not seep

The invention claimed is:

1. A method of producing a polarizing lens, said method comprising:
dyeing a polyvinyl alcohol film having a first and second surface separated by a thickness, with a dichroic dye in a thickness direction to no more than one third of the thickness of the polyvinyl alcohol film to obtain a polarizing film,
forming a polarizing sheet by bonding a first aromatic polycarbonate sheet to a first surface of the polarizing film via an adhesive layer, and bonding a second aromatic polycarbonate sheet to a second surface of the polarizing film via an adhesive layer,
bending the polarizing sheet to have a spherical or aspherical surface to form a polarizing lens,
measuring color tone of the polarizing sheet before the bending and color tone of the polarizing lens after the bending, and
obtaining a color difference of the polarizing sheet and the polarizing lens before and after the bending based on the color tones, using the formula $((\Delta L^*)^2+(\Delta a^*)^2+(\Delta b^*)^2)^{1/2}$,
wherein the color difference is between 1.4 and 1.9.

2. A method of producing a polarizing lens, said method comprising:
dyeing a polyvinyl alcohol film having a first and second surface separated by a thickness, with a dichroic dye in a thickness direction to no more than one third of the thickness of the polyvinyl alcohol film to obtain a polarizing film,
forming a polarizing sheet by bonding a first aromatic polycarbonate sheet to the first surface of the polarizing film via an adhesive layer and bonding a second aromatic polycarbonate sheet to the second surface of the polarizing film via an adhesive layer,
bending the polarizing sheet to have a spherical or a spherical surface, and injecting an aromatic polycarbonate onto a surface of at least one of the aromatic polycarbonate sheets to form a polarizing lens,
measuring color tone of the polarizing sheet before the bending and color tone of the polarizing lens after the bending, and
obtaining a color difference of the polarizing sheet and the polarizing lens before and after the bending based on the color tones, as measured using the formula $((\Delta L^*)^2+(\Delta a^*)^2+(\Delta b^*)^2)^{1/2}$,
wherein the color difference is between 1.4 and 1.9.

3. The method of producing a polarizing lens according to claim 1, wherein a retardation value of the aromatic polycarbonate sheet is from 2,000 nm to 20,000 nm.

4. The method of producing a polarizing lens according to claim 2, wherein a retardation value of the aromatic polycarbonate sheet is from 2,000 nm to 20,000 nm.

5. The method of producing a polarizing lens according to claim 1, wherein the polarizing film is treated with a metal compound and boric acid.

6. The method of producing a polarizing lens according to claim 2, wherein the polarizing film is treated with a metal compound and boric acid.

7. The method of producing a polarizing lens according to claim 1, wherein said method further comprising stretching the polyvinyl alcohol film before dyeing the polyvinyl alcohol film.

8. The method of producing a polarizing lens according to claim 2, wherein said method further comprising stretching the polyvinyl alcohol film before dyeing the polyvinyl alcohol film.

9. The method of producing a polarizing lens according to claim 1, wherein the dichroic ratio of the polarizing film at 530 nm obtained by the following formula:

Dichroic ratio=$Az/Ax$ is 17.8 to 29.9.

10. The method of producing a polarizing lens according to claim 2, wherein the dichroic ratio of the polarizing film at 530 nm obtained by the following formula:

Dichroic ratio=$Az/Ax$ is 17.8 to 29.9.

11. The method of producing a polarizing lens according to claim 1, wherein the dichroic dye is of a single color.

12. The method of producing a polarizing lens according to claim 2, wherein the dichroic dye is of a single color.

* * * * *